United States Patent Office 2,891,099
Patented June 16, 1959

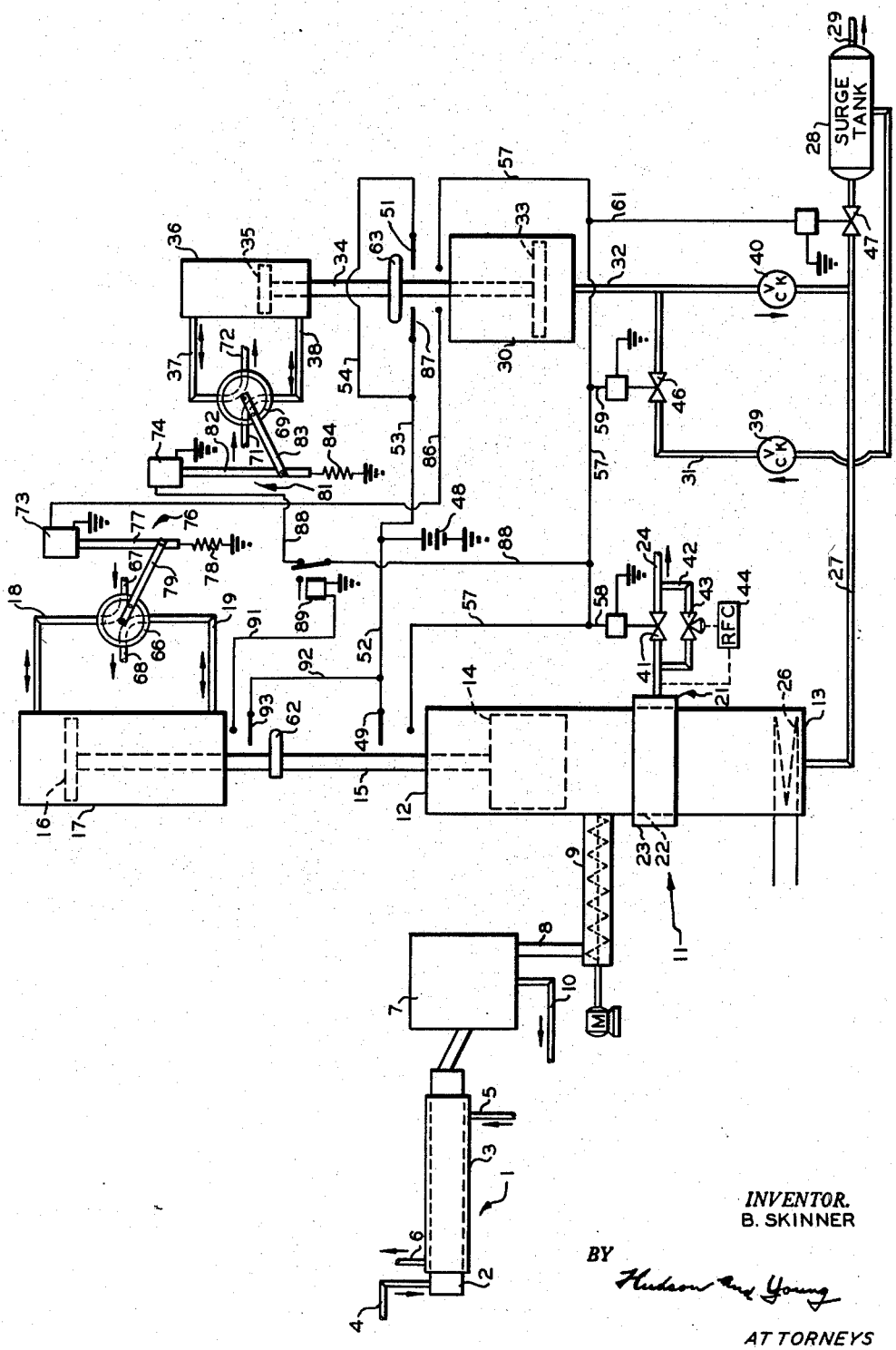

2,891,099

FRACTIONAL CRYSTALLIZATION PROCESS AND APPARATUS

Bradley Skinner, Bartlesville, Okla., assignor to Phillips Petroleum Company, a corporation of Delaware Application May 16, 1955, Serial No. 508,718

11 Claims. (Cl. 260—666)

This invention relates to the separation and purification of components from liquid mixtures. In one of its aspects, it relates to the separation and purification of liquid multi-component mixtures by fractional crystallization. In another of its aspects, it relates to a method for controlling the operation of the crystal separation and purification column of fractional crystallization apparatus. In still another of its aspects, it relates to improved fractional crystallization apparatus which includes means for controlling the operation of the purification column so as to prevent its becoming plugged as a result of reflux liquid refreezing therein.

The separation of chemical compounds by means of crystallization finds many applications in industrial installations. While many separations can be made by distillation or solvent extraction, there are cases where these methods are impracticable or impossible, and the desired separation can be effected more advantageously by means of crystallization. Thus, in the case of chemical isomers having similar boiling points and solubilities or materials having relatively high boiling ranges, or thermally unstable substances, separation by crystallization may well be the only method which can be advantageously employed.

As well as offering in some cases perhaps the only practicable method of separation, the crystallization method offers the further advantage of being the only separation method which theoretically gives a pure product in a single stage of operation. In actual practice, however, the crystals obtained from a solution of several components will be impure because of the occlusion of mother liquor within the crystal interstices. In the conventional fractional crystallization processes, the crystal yield from one batch crystallization is redissolved in a solvent or remelted and again crystallized to effect further purification. The recrystallized product will have less impurity since the concentration of impurity in the new liquor is less than in the previous liquor of crystallization. Such processes require a large amount of equipment and floor space for their operation with resulting high operating expenditures in terms of labor and equipment costs. Furthermore, in these types of processes, the purity of the product is limited by the number of stages through which the process is carried.

More recently, a continuous method of separating and purifying liquid multi-component mixtures has been advanced which overcomes the disadvantages of conventional fractional crystallization processes. This method involves the use of a purification column in one end of which a melting section is maintained. The crystals upon introduction into the purification column are moved therethrough toward the melting section where the crystals are melted. A portion of the resulting melt is passed as reflux countercurrent to crystal movement and in intimate contact therewith so as to displace occluded impurities. The present invention constitutes an improvement upon fractional crystallization apparatus which utilize a reflux stream to produce a high purity product.

When practicing a fractional crystallization process as described hereinabove, the high purity of product obtainable is believed to be due at least in part to the action of the reflux stream in contacting the crystals. It is believed that the reflux stream refreezes upon the crystals moving toward the melting zone, thereby displacing occluded impurities. A stream comprising displaced impurities is thereafter removed from the column upstream, with respect to crystal movement, of the melting zone. In order to effect a high degree of purification, it is important that all of the crystals be contacted with the reflux stream prior to entering the melting zone.

The refreezing of the reflux stream upon the crystals so as to displace occluded impurities is believed to occur in a comparatively narrow zone adjacent the melting zone. In certain isolated instances, the warm end of the crystal bed may become so dense as a result of the refreezing of the reflux stream as to cause plugging of the column. This undesirable result is more liable to occur when operating the column so as to obtain an extremely high degree of purification. Thus, in order to obtain a high degree of purification, it becomes necessary to increase the amount of liquid passed as a reflux stream into the moving mass of crystals, and the higher the desired purity of the product the denser the warm end of the crystal bed becomes and the more difficult it is to force the reflux liquid required up through the crystal bed.

The reflux stream in refreezing upon the crystals gives up heat which raises the temperature of the crystals in the warm end of the crystal bed. This is the major source of heat for raising the temperature of the crystals to their melting point. As the difference between the crystal inlet temperature and the crystal melting point increases, it becomes necessary to increase the amount of reflux liquid in order to supply the required amount of heat. And, as mentioned above, the refreezing of an increasing amount of reflux liquid may in some cases cause the column to become plugged. The optimum amount of liquid refluxed is that necessary to transfer sufficient heat to the crystals to raise their temperature to their melting point and cause them to melt as they enter the melting zone. In accordance with this invention, a novel method for operating a purification column is provided whereby the optimum amount of reflux liquid is supplied to the column while avoiding plugging of the column as a result of the refreezing of this liquid.

The following are objects of the invention.

It is an object of the invention to provide an improved process for separating components from liquid multi-component mixtures.

Another object of the invention is to provide improved fractional crystallization apparatus.

Still another object of the invention is to provide a method for operating a purification column of fractional crystallization apparatus so as to eliminate any tendency the column may have to become plugged.

A further object of the invention is to provide a method for controlling the rate at which reflux liquid is supplied to a purification column of fractional crystallization apparatus.

A still further object of the invention is to provide means for synchronizing the movement of the crystal mover of the purification column of fractional crystallization apparatus with the withdrawal of product and mother liquor from the column and with the supply of reflux liquid to the column.

Other and further objects of the invention will become apparent to one skilled in the art upon consideration of the following disclosure.

Broadly speaking, the present invention resides in a method for controlling the density or porosity of the crystal bed within the crystal purification column of fractional crystallization apparatus and the supply of reflux liquid to the column and in means for accomplishing such control. In accordance with a broad aspect, the invention comprises moving a slurry of crystals in mother liquor through a purification zone toward a melting zone, separating a measured amount of mother liquor from said slurry, withdrawing melt from the melting zone only during the period when the slurry is moving through the purification zone, terminating the movement of slurry through the purification zone, and returning a portion of the withdrawn melt as reflux to the melting zone under pressure, thereby forcing melt from the melting zone through the purification zone. The melt forced from the melting zone through the purification zone displaces remaining mother liquor from the crystal slurry and refreezes upon the crystals, thereby displacing occluded impurities from the crystals. A stream comprising mother liquor and occluded impurities is removed from the purification zone upstream, with respect to crystal movement, of the melting zone.

I have found that by operating the purification column in accordance with the method of this invention, the crystal bed within the column is maintained in a porous state as contrasted with a compact crystal bed. The term "porous crystal bed" as used herein is descriptive of a bed containing mother liquor in the spaces between the crystals. These spaces are filled with mother liquor, the total volume of such spaces being dependent upon the quantity of mother liquor remaining in the slurry after separation of a measured amount therefrom. The quantity of mother liquor remaining in the crystal bed is preferably about equal to the amount of liquid returned to the column as reflux, and, as mentioned hereinabove, the optimum amount of liquid refluxed is that necessary to raise the crystals to their melting point. In the case of a compact crystal bed, substantially all of the mother liquor has been separated from the crystal slurry. By providing a crystal bed which is porous, it is possible to refreeze the required amount of reflux liquid while eliminating the possibility of the column becoming plugged. The process and apparatus of this invention are applicable to a vast number of simple binary and complex multi-component systems. The invention is particularly applicable to the separation of hydrocarbons which have practically the same boiling points, and are, therefore, difficult to separate by distillation. Where high boiling organic compounds are concerned, separation by distillation is often undesirable because many such compounds are unstable at high temperatures. In order to illustrate some of the systems to which the invention is applicable, the following compounds are grouped with respect to their boiling points:

| Group A | B.P., °C. | F.P., °C. |
|---|---|---|
| Benzene | 80 | 5.5 |
| n-Hexane | 69 | −94 |
| n-Heptane | 98.52 | −90.5 |
| Carbon Tetrachloride | 77 | −22.8 |
| Acrylonitrile | 79 | −82 |
| Ethyl Alcohol | 78.5 | −117.3 |
| 2,2-Dimethylpentane | 79 | −125 |
| 2,3-Dimenthylpentane | 86 | |
| Methyl ethyl ketone | 79.6 | −86.4 |
| Methylpropionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |

| Group B | B.P., °C. | F.P., °C. |
|---|---|---|
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B.P., °C. | F.P., °C. |
|---|---|---|
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2-4,Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |

| Group D | B.P., °C. | F.P., °C. |
|---|---|---|
| Aniline | 184.4 | −6.2 |
| Toluene | 110.8 | −95 |
| Benzene | 80.0 | 5.5 |

| Group E | B.P., °C. | F.P., °C. |
|---|---|---|
| Carbon tetrachloride | 77 | −22.8 |
| Chloroform | 61 | −63.5 |
| CS₂ | 46.3 | −108.6 |
| Acetone | 56.5 | −95 |

| Group F | B.P., °C. | F.P., °C. |
|---|---|---|
| Ortho-xylene | 144 | −27.1 |
| Meta-xylene | 138.8 | −47.4 |
| Para-xylene | 138.5 | 13.2 |

| Group G | B.P., °C. | F.P., °C. |
|---|---|---|
| Ortho-cymene | 175.0 | −73.5 |
| Meta-cymene | 175.7 | <−25 |
| Para-cymene | 176.0 | −73.5 |

| Group H | B.P., °C. | M.P., °C. |
|---|---|---|
| Dimethyl phthalate | 282 | 5.5 |
| Dimethyl isophthalate | 124 (12 mm.) | 67 |
| Dimethyl terephthalate | 288 | 140.6 |

| Group I | B.P., °C. | M.P., °C. |
|---|---|---|
| Ortho-nitrotoluene | 222.3 | α −10.6 / β −4.1 |
| Meta-nitrotoluene | 231 | 15.5 |
| Para-nitrotoluene | 238 | 51.3 |

Mixtures consisting of any combination of two or more of the components within any one of the groups can be resolved by the process of the invention, as can mixtures made up of components selected from different groups; for example, benzene can be separated from a benzene-n-hexane or a benzene-n-heptane mixture in which the benzene is present in an amount greater than the eutectic concentration. In the same manner, para-xylene can be readily separated from a mixture of para- and meta-xylenes or from para-, meta-, or ortho-xylenes. Benzene can also be separated from a mixture thereof with toluene and/or aniline. Multi-component mixtures which can be effectively resolved so as to recover one or more of the components in substantially pure form include mixtures of at least two of 2,2-dimethylpentane, 2,4-dimethylpentane, 2,2,3-trimethylbutane, methyl cyclohexane, 2,2,4-trimethylpentane, and mixtures of at least two of carbon tetrachloride, chloroform, and acetone. The invention is also applicable to the separation of individual components from a system of cymenes.

This invention can also be utilized to purify naphthalene, hydroquinone (1,4-benzenediol), paracresol, paradichlorobenzene, and such materials as high melting waxes, fatty acids, and high molecular weight normal paraffins. The invention can also be used to resolve a mixture comprising anthracene, phenanthrene, and carbazole. Furthermore, the invention can be used to separate durene (1,2,4,5-tetramethylbenzene) from $C_{10}$ aromatics. In cases where the material to be purified has a relatively high crystallization point, the impure material is raised to a temperature at which only a portion of the mixture is in a crystalline state, and the resulting slurry is handled at such a temperature that operation is as described in connection with materials which crystallize at lower temperatures.

It is not intended, however, to limit the invention to organic mixtures, but rather it is applicable to inorganic mixtures as well, and offers a practical method of separating two inorganic components between which solvates or hydrates are formed. Examples of inorganic systems to which this invention is applicable are those for the recovery of pure salts, such as ammonium nitrate, and of anhydrous salts from their hydrates.

In certain cases, it is also desirable to recover mother liquor separated from the crystals as a product of the process. This situation arises where it is desired to increase the concentration of a dilute solution. This aspect of the invention is especially applicable to the production of concentrated food products which involves primarily the removal of water from these products. Accordingly, by utilizing the process of this invention, water can be removed from fruit juices such as grape, orange, lemon, pineapple, apple, tomato, etc. It is also possible to concentrate vegetable juices and beverages such as milk, beer, wine, coffee or tea by this method.

A more comprehensive understanding of the invention may be had by referring to the following description and the drawing, which is a schematic representation and flow plan illustrating the invention.

Referring now to the drawing, the fractional crystallization apparatus of this invention includes a chiller 1 which comprises cylinder 2 and jacket 3. Feed line 4 is connected to the cylinder for introduction of feed material. Lines 5 and 6 provide means for introducing a heat exchange fluid or refrigerant, such as expanding liquid propane, into the annular space formed between cylinder 2 and jacket 3 and for withdrawing the same therefrom. Chiller 1 may be equipped with means for moving crystals therethrough such as a reciprocating piston or an auger. It is to be understood that other suitable refrigeration means, e.g., a direct refrigeration means, can be utilized, which come within the scope of the invention.

The delivery end of chiller 1 is connected to filter 7 which serves as a prefilter. Conduit 8 connects the filter to feed conduit 9 while line 10 provides means for withdrawing mother liquor from the crystal slurry introduced into filter 7 from chiller 1. While filter 7 is preferably a rotary type filter, other means for separating crystals from the mother liquor may be employed such as an in-line filter or a centrifuge. It is also within the scope of the invention to omit the prefilter in which case the discharge end of the chiller is connected directly to the separation and purification column 11. Whether a prefilter is utilized is dependent primarily upon the composition of the feed mixture. With a lean feed it has been found to be desirable to use a prefilter, but with a rich feed it is preferred to operate without the prefilter. Feed conduit 9, which may be provided with an auger or piston for moving crystal slurry therethrough, is connected to crystal separation and purification column 11 in a manner to be described more in detail hereinafter.

Crystal separation and purification column 11 is an elongated tubular member closed at its upper and lower ends by closure members 12 and 13, respectively. The upper end of column 11 is provided with a crystal compacting means, such as an impervious piston 14, connected by a connecting rod 15 to a hydraulic piston 16 in hydraulic cylinder 17. Piston 14 is formed so that material can be introduced into the column only when the face of the piston is above the opening of conduit 9 into the column. Lines 18 and 19 serve to pass hydraulic fluid alternately into and out of cylinder 17 so as to drive piston 16 which in turn causes the movement of piston 14. While piston 14 is shown as an impervious piston, it is within the contemplation of the invention to utilize a porous piston in which case the piston operates as a filter as well as a means for moving crystals through the column. When operating the column with a porous piston, an outlet line provided with a suitable flow control means is connected to the upper end of the column for removal of liquid therefrom.

Filter section 21, disposed in an intermediate portion of crystal separation and purification column 11, comprises a filter screen 22, substantially cylindrical in shape, surrounded by a jacket member 23. Line 24 connected to jacket member 23 is for withdrawal of liquid from the filter section. Feed conduit 9 communicates with an intermediate portion of the column between filter 21 and the face of piston at the end of its backstroke. A heating means is disposed in the lower end of column 11 in order to maintain a relatively high temperature at that end. As illustrated, the heating means is a coil 26 through which a heat transfer medium is circulated. It is not intended to limit the invention to the specific heat exchange means shown, for other suitable means can be employed. For example, an electrical heater can be positioned next to closure member 13, a coil can be disposed around column 11 at its lower end, or an electrical bayonet type heater may be provided to extend into the end of the purification column. A liquid outlet line 27 is connected to the end of column 11 in order to provide means for removal of melt from the melting zone maintained in that end of the column by the heat exchange means. Line 27 is further connected to a surge tank 28 having an outlet line 29 attached thereto for removal of the purified product.

Surge tank 28 is connected to reflux cylinder 30 by means of lines 31 and 32 the latter line extending between the lower portion of the cylinder and outlet line 27. Disposed within reflux liquid cylinder 30 is piston 33, connected by a connecting rod 34 to hydraulic piston 35 in hydraulic cylinder 36. Lines 37 and 38 provide means for passing a hydraulic fluid alternately into and out of cylinder 36 so as to drive piston 35 which in turn causes the movement of piston 33. Lines 31 and 32 contain check valves 39 and 40, respectively, check valve 39 being adapted to remain open only when piston 33 is on its backstroke whereas valve 40 is adapted to remain open only when piston 33 is on its downstroke. Thus, liquid is prevented from passing through line 31 into surge tank 28 when piston 33 is on its downstroke.

Line 24 connected to jacket 23 of filter section 21 contains a flow control means such as solenoid valve 41. By-pass line 42, connected to line 24 on either side of valve 41, contains a flow control means such as motor valve 43. Rate of flow controller 44 which is operatively connected to line 24 and to valve 43 provides means for obtaining a regulated flow of liquid from filter 21 when valve 41 is in a closed position. Line 31 connecting surge tank 28 to cylinder 30 and line 27 connecting column 11 to the surge tank also contain flow control means such as solenoid valves 46 and 47, It is noted that solenoid valve 47 is positioned in line 27 between surge tank 28 and the juncture of line 27 with line 32. Valve 41 is a normally closed valve while valves 46 and 47 are normally open valves.

The solenoids of valves 41, 46 and 47 are connected to a source of current, such as battery 48, by suitable electrical leads containing switches 49 and 51. Thus, electrical lead 52 connects the positive terminal of battery 48 to the switch arm of switch 49 while electrical leads 53 and 54 connect the positive terminal of the battery to the switch arm of switch 51. The negative terminal of battery 48 and each of the solenoids are grounded as indicated in the drawing. The solenoids of valves 41, 46 and 47 are connected to the terminals of switches 49 and 51 by means of electrical lead 57 and electrical leads 58, 59 and 61, the latter three leads being connected to lead 57. Switches 49 and 51, which may be spring biased, are actuated by cams 62 and 63, respectively, attached to connecting rods 15 and 34.

Hydraulic fluid lines 18 and 19 attached to hydraulic cylinder 17 are further connected to two of the ports of four-way valve 66. Line 67 attached to the third port of the four-way valve is further connected to a source of hydraulic fluid, not shown, while line 68 attached to the fourth port provides means for venting hydraulic fluid from cylinder 17. Associated with hydraulic fluid lines 37 and 38 of hydraulic cylinder 36, there is a similar four-way valve 69. Lines 71 and 72, connected to two of the ports of the valve, provide means for introducing a hydraulic fluid into cylinder 36 and for removal of the fluid therefrom.

Valves 66 and 69, as illustrated, are solenoid operated valves, which are connected through suitable mechanical linkages to solenoids 73 and 74, respectively. Mechanical linkage 76 comprises a vertical member 77, held in a downward position by means of spring 78 when solenoid 73 is not energized, and arm 79 operatively connected to valve 66. A similar mechanical linkage 81 comprises vertical member 82, arm 83, and spring 84, which operates to hold vertical member 82 and arm 83 in a downward position when solenoid 74 is not energized.

Electrical current to solenoid 73 is supplied from battery 48 through electrical leads 53 and 86. Line 53 is connected to the switch arm of switch 87, line 86 being connected between the terminal of the switch and solenoid 73. Switch 87, which may be spring biased, is actuated by cam 63 attached to connecting rod 34. Solenoid 74 is connected to battery 48 by means of electrical lead 88 which extends between solenoid 74 and electrical lead 57. Electrical lead 88 is provided with a relay 89 which is also connected to battery 48 by means of electrical leads 91 and 92. Thus, electrical lead 92 is connected to lead 52 and to the switch arm of switch 93 while lead 91 is connected to the terminal of switch 93 and relay 89. Switch 93, which may also be spring biased, is actuated by cam 62 attached to connecting rod 15.

It is not intended to limit the invention to any specific type of switch, for any suitable electrical switch can be employed. For example, a microswitch can be advantageously utilized in conjunction with this invention. Furthermore, it is to be understood that the invention is not limited to the specific type of valves which have been illustrated and described, for other types of valves can be employed which will operate satisfactorily. For example, a control system can be provided which uses pneumatically operated valves rather than solenoid valves without departing from the scope of the instant invention.

While the fractional crystallization apparatus of this invention has for the sake of clarity been illustrated and described as occupying a substantially vertical position, it is not intended to so limit the invention. It is to be understood that the apparatus can be otherwise disposed without departing from the spirit or scope of the invention. Thus, the separation and purification column can be positioned horizontally, or the column can be operated vertically but with the melting zone in the top of the column rather than the bottom as illustrated. Furthermore, while the invention has been described in relation to specific means for synchronizing the movements of the column piston and the reflux liquid cylinder piston, it is not intended to limit the invention to any specific control means, for other suitable means can be employed which will come within the scope of the invention.

In the operation of the apparatus of the drawing, a liquid feed mixture, which can be liquid multi-component mixture containing components of different melting points, is introduced through line 4 into chiller 1. Refrigerant is passed into the annular space between cylinder 2 and annular jacket 3 by means of line 5 and withdrawn therefrom through line 6 at a rate sufficient to maintain chiller 1 at a temperature low enough to crystallize one of the components. The crystal slurry formed within chiller 1 is removed therefrom and passed into filter 7 which acts as a prefilter. In filter 7 mother liquor is separated from the crystal slurry and withdrawn from the filter through line 10 while the crystals with remaining mother liquor are removed from the filter through conduit 8 and then passed into feed conduit 9.

From feed conduit 9 the thickened slurry of crystals and mother liquor is moved into separation and purification column 11. As previously discussed, piston 14 is so constructed that introduction of material into the column is possible only when the lower end of the piston is above the entrance end of conduit 9. The slurry on entering column 11 is moved downwardly by piston 14 toward the melting zone maintained in the end of the column by heating means 26. Piston 14 is forced downwardly and upwardly by means of hydraulic piston 16 which is moved in response to fluid introduced and withdrawn from hydraulic cylinder 17 through lines 18 and 19.

As illustrated in the drawing, hydraulic fluid supplied from a source, not shown, by means of line 67 is entering the upper end of hydraulic cylinder 17 through line 18. Piston 16 and piston 14 connected thereto by connecting rod 15 are as a result moving downwardly. Furthermore, hydraulic fluid, supplied from the same source by means of line 71, is entering the lower end portion of hydraulic cylinder 36 through line 38. As a result hydraulic piston 35 in hydraulic cylinder 36 is moving upwardly carrying with it piston 33 contained in reflux liquid cylinder 30 and connected thereto by means of connecting rod 34. With the pistons in the positions shown, it is noted that cams 62 and 63 attached to connecting rods 15 and 34, respectively, are out of contact with switches 49, 51, 87 and 93 so that each of these switches is in an open position. As a result, there is no flow of electrical current from battery 48 to the several solenoids which are accordingly deenergized.

As previously described, solenoid valve 41 is normally closed whereas solenoid valves 46 and 47 are normally open, i.e., the valves are in these respective positions when their solenoids are deenergized. During the downward or compression stroke of piston 14 solenoid valve 41 remains closed, and any mother liquor separated from the crystal slurry in filter section 21 is removed therefrom by means of line 24 and line 42 which by-passes valve 41. The amount of mother liquor removed from the separation and purification column during the compression stroke of piston 14 is regulated by giving rate of flow controller 44 an index setting corresponding to the desired rate of mother liquor withdrawal. The controller then operates to control the opening of valve 43 so as to maintain the set rate of flow.

The amount of mother liquor to be withdrawn is, in general, directly related to the quantity of liquid to be subsequently refluxed from reflux liquid cylinder 30. More specifically, the amount of mother liquor separated from the crystal slurry is controlled so that the volume of mother liquor remaining in the slurry is about equal to the volume of the liquid to be refluxed. As noted hereinabove, the amount of liquid which it is desired to reflux is that necessary to transfer sufficient heat to the crystals to raise their temperature to their melting point and cause them to melt as they enter the melting zone. Since the volume of mother liquor remaining in the column at the end of the compression stroke of piston 14 is about equal to the volume of liquid to be refluxed, there are sufficient spaces between the crystals in the column to accommodate refreezing of the reflux liquid upon the crystals without causing plugging of the column.

The optimum amount of liquid to be refluxed depends upon several operating variables including of course the size of the particular separation and purification column utilized and the specific mixture being processed. The sensible heat of the crystals being purified and the heat of fusion of the crystal melt are known values, and by knowing the quantity of crystals to be raised to their melting point and the temperature of the crystals, the amount of reflux liquid required can be easily calculated. Furthermore, the amount of mother liquor in the crystal slurry entering the column can also be readily determined. Thus, the composition of the feed mixture and the crystallization temperature are known so that the amount of mother liquor contained in the crystal slurry formed in chiller 1 can be calculated, and the amount of mother liquor separated in filter 7 can be measured. After having determined the amount of liquid to be refluxed and the amount of mother liquor in the crystal slurry entering the column, rate of flow controller 44 is set so that sufficient mother liquor is withdrawn so as to provide a crystal slurry containing a quantity of mother liquor substantially equal to the volume of reflux liquid.

In certain separations, however, it may be unnecessary to withdraw any mother liquor from the column during the compression stroke of piston 14. In the operation of the column, so as to obtain a high purity product, it is desirable that the reflux liquid displace all of the mother liquor from the crystal slurry. The closer these optimum operating conditions are approached the higher the product purity which can be obtained. It may happen, however, in some cases that the amount of mother liquor in the entering crystal slurry is less than the amount of liquid to be returned to the column as reflux. It then becomes necessary to set rate of flow controller 44 so that valve 43 is closed, and no mother liquor is then removed from the column during the compression stroke of the piston. In order to take full advantage of this invention, it may be desirable to adjust the operating conditions, e.g., the crystallization temperature or the rate of withdrawal of mother liquor from filter 7, so that the slurry entering the column may contain an amount of mother liquor at least equal to the amount of reflux liquid.

While, as discussed hereinabove, the mother liquor withdrawal rate and the reflux liquid introduction rate can be easily determined by calculations, it is within the contemplation of the invention to depend upon analyses of the mother liquor and product streams in order to make the required adjustments in operating conditions. Thus, the streams recovered through lines 24 and 29 can be analyzed using well known instrumentation, such as infrared analyzers or differential refractometers, in order to determine the amount present in these streams of the component to be separated. In this regard, an analysis showing a low product purity indicates that insufficient liquid is being refluxed to the column or that insufficient mother liquor is being removed from the column during the piston downstroke. An analysis of the mother liquor stream which shows an excessive amount of the component indicates that too much liquid is being returned to the column as reflux. Any tendency for the column to become plugged indicates that too much mother liquor is being removed from the column during the piston downstroke so that there are insufficient spaces to allow for refreezing of the mother liquor. Thus, on the basis of analyses of the column streams and by direct observation of column operation, it is possible to effectively regulate the mother liquor withdrawal rate and the reflux liquid introduction rate.

During the compression stroke of piston 14, melt resulting from the melting of crystals entering the melting zone is removed from the end of the column in unrestricted flow through line 27 and passed into surge tank 28. By withdrawing the melt in this manner during the downstroke of the column piston, substantially no back pressure is maintained on the crystal melting zone, and the crystals on entering this zone, therefore, displace substantially none of the melt upwardly through the column. Since the crystal slurry is advanced through the column against substantially no back pressure and under controlled filtration conditions, the density of the crystal bed is less than in operations where filtration occurs in the column so as to form a compact bed therein and refluxing takes place as a result of the displacing action of the crystals entering the melting zone.

As previously mentioned, while column piston 14 is on its downstroke, piston 33 in reflux liquid cylinder 30 is on its backstroke. As a result, liquid contained in surge tank 28 flows through lines 31 and 32 into cylinder 30. The amount of liquid which is passed into cylinder 30 for subsequent return to column 10 as reflux can be controlled by varying the length of the stroke of piston 33.

When column piston 14 reaches the end of its downstroke, which is preferably at about the top of filter section 21, cam 62 attached to connecting rod 15 contacts the switch arm of switch 49 and closes the switch. As a result of the closing of switch 49, electrical current from battery 48 flows through electrical leads 52 and 57, thereby energizing the solenoids of valves 41, 46 and 47. The closing of switch 49 also allows current to flow from battery 48 through electrical lead 88 to solenoid 74 associated with four-way valve 69. Valve 41 is now in an open position while valves 46 and 47 are closed. Four-way valve 69 is now in a position opposite from that shown in the drawing as a result of vertical member 82 and arm 83 connected thereto being moved upwardly through the action of solenoid 74 becoming energized. Hydraulic fluid now enters the upper end portion of hydraulic cylinder 36 through line 37 and is removed therefrom through line 38 so as to cause hydraulic piston 35 to move downwardly. It is noted that four-way valve 66 is unaffected by the closing of switch 49, the pressure exerted by the hydraulic fluid continuing to maintain hydraulic piston 16 in its downward position. Column piston 14 is thereby maintained at the end of its downstroke, keeping switch 49 in a closed position, by means of cam 62.

Movement of hydraulic piston 35 in hydraulic cylinder 36 downwardly causes piston 33 to commence its downward or compression stroke. Reflux liquid which was drawn into the cylinder during the piston backstroke is now forced out of the cylinder through line 32. Since valve 47 is in a closed position, the reflux liquid flows through line 27 into the melting zone in the lower end of column 11. As discussed hereinabove, liquid is returned to the column as reflux in an amount sufficient to cause crystals therein to be melted as they enter the melting zone. The reflux liquid on entering the melting zone under pressure forces melt from the zone into the slurry of crystals in mother liquor contained in the separation and purification column. The melt so forced from the melting zone displaces mother liquor from the slurry and refreezes upon the crystals, thereby displacing occluded impurities. The displaced mother liquor and occluded impurities pass through the purification column toward filter section 21 and are removed therefrom by means of line 24, valve 41 being open during this portion of the cycle of operation. As a result of the refreezing of the reflux liquid upon the crystals and the accompanying displacement of occluded impurities, the crystals reaching the melting zone of the purification column are substantially pure crystals. When the column piston is subsequently moved downwardly moving the purified crystals into the melting zone, the resulting melt which is removed from the zone constitutes the purified product of the process. Furthermore, it is a portion of this purified product which is returned to the purification column as reflux liquid through the operation of reflux liquid piston 33. By operating the purification column so that a controlled amount of mother liquor is removed on the downstroke of the column piston, a porous crystal bed as contrasted with a compact crystal bed is provided in the column. It is thus possible to return to the column the amount of reflux liquid required to raise the temperature of the crystals to their melting point without causing plugging of the column as a result of the reflux liquid refreezing upon the crystals.

At the end of the downstroke of piston 33, cam 63 attached to connecting rod 34 contacts the switch arm of switch 87 thereby closing the switch. As a result, electrical current now flows to solenoid 73 associated with four-way valve 66 through electrical leads 53 and 86. Solenoid 73 is thereby energized, moving vertical member 77 and arm 79 attached thereto upwardly so as to change the position of valve 66 to a position opposite that shown in the drawing. Hydraulic fluid now enters hydraulic cylinder 17 through line 19 while fluid in the opposite end of the cylinder is vented through line 18. Hydraulic piston 16 is thereby moved upwardly and column piston 14 connected thereto by connecting rod 15 commences its backstroke. In moving upwardly column piston 14 uncovers the opening of feed conduit 9 into the column and allows the slurry of crystals in mother liquor to enter the column.

Cam 63 in moving downwardly with connecting rod 34 also contacts the switch arm of switch 51, thereby closing this switch. As a result of closing switch 51, electrical current continues to flow from battery 48 to the solenoids of valves 41, 46 and 47 and to solenoid 74 associated with valve 69 even after switch 49 is allowed to open as a result of cam 62 moving out of contact therewith. Thus, valve 41 is maintained in an open position and valves 46 and 47 are caused to remain closed until such time as cam 63 allows switch 51 to open. Cam 63 maintains switch 51 as well as switch 87 in a closed position so long as hydraulic piston 35 is in a downward position as a result of hydraulic fluid entering hydraulic cylinder 36 through line 37. And hydraulic piston 35 remains in a downward position with piston 33 at the end of its downward stroke until cam 62 attached to connecting rod 15 makes contact with the switch arm of switch 93.

When hydraulic piston 16 reaches its upper position and column piston 14 is at the end of its backstroke, cam 62 contacts the switch arm of switch 93, thereby closing the switch. As a result, current is allowed to flow to relay 89 through electrical leads 92 and 91, thereby opening the switch contained in electrical lead 88. Electrical current now no longer flows to solenoid 74 associated with valve 69, and the solenoid is thereby deenergized, causing the valve to be positioned as shown in the drawing. With valve 69 in this position, hydraulic fluid enters the lower end portion of hydraulic cylinder 36 through line 38, and hydraulic piston 35 commences to move upwardly carrying with it reflux liquid piston 33. The upward movement of connecting rod 34 causes cam 63 to break contact with the switch arms of switches 51 and 87, thereby allowing these switches to open.

Because of the opening of switches 51 and 87, electrical current from battery 48 no longer flows through electrical lead 57 to the solenoids of valves 41, 46 and 47 and through electrical lead 86 to solenoid 73. Solenoid 73 is thereby deenergized, changing valve 66 to the position shown in the drawing so that hydraulic fluid now enters the upper end portion of hydraulic cylinder 17 through line 18. Hydraulic piston 16 is thereby caused to move downwardly and column piston 14 connected thereto commences its downward stroke as previously described at the beginning of this discussion.

As a result of the termination of the flow of current to the solenoids of valves 41, 46 and 47, these valves are allowed to return to their normal positions, i.e., valve 41 is in a closed position while valves 46 and 47 are open. As hydraulic piston 16 starts to move downwardly, cam 62 also breaks contact with the switch arm of switch 93, permitting this switch to open. Electrical current is as a result no longer supplied to relay 89, and the switch arm in electrical lead 88 is allowed to return to its closed position. It is noted, however, that electrical current still is not supplied to solenoid 74 since switch 49 is in an open position and remains so until contacted by cam 62 at the end of the column piston downstroke. The cycle of operation thereafter continues as described hereinabove.

A more comprehensive understanding of the invention may be obtained by referring to the following illustrative example, which is not intended, however, to be unduly limitative of this invention.

A feed material containing about 47 weight percent para-xylene is charged to the chiller of fractional crystallization apparatus similar to that illustrated in the drawing at a temperature of about 90° F. and at a rate of 1000 pounds per hour. The feed mixture is cooled in the chiller to a temperature of −72° F., causing para-xylene to crystallize and form a slurry containing 40 percent solids. The slurry is then passed directly into the separation and purification column, the prefiltering step being omitted with this particular feed composition. The crystal slurry is moved by means of the column piston through the column toward the melting zone maintained in the end of the column at a temperature above the melting point of the para-xylene crystals. During the compression stroke of the column piston, mother liquor is separated from the crystal slurry in an intermediate portion of the column and removed therefrom at a rate of 344 pounds per hour. Melt containing 98.0 weight percent para-xylene is removed from the melting zone during the compression stroke of the column piston at a rate of 656 pounds per hour and passed into the surge tank. Also during the compression stroke of the column piston, melt is recovered from the surge tank as a product of the process at a rate of 400 pounds per hour while melt is passed from the surge tank to the reflux liquid cylinder at a rate of 256 pounds per hour. When the column piston reaches the end of its compression stroke, it is maintained in this position while liquid is forced from the reflux liquid cylinder into the melting zone. As a result, melt passes from the melting zone into the moving crystals, displacing mother liquor from between the crystals and refreezing upon the crystals and thereby displacing occluded impurities. A stream comprising mother liquor and occluded impurities is removed from an intermediate portion of the column at a rate of about 256 pounds per hour. When the reflux liquid piston completes its compression stroke, the cylinder piston commences its backstroke, during the latter part of which crystal slurry enters the column. The column piston thereafter begins its compression stroke, and the cycle of operation is repeated as described above.

It will be apparent to those skilled in the art that various modifications of the invention can be made upon study of the accompanying disclosure. Such modifications are believed to be clearly within the scope and spirit of the invention.

I claim:

1. A process for separating a component from a liquid multi-component mixture which comprises passing a slurry of crystals of said component in mother liquor into a purification zone, moving said slurry through said purification zone toward a melting zone; separating a measured amount of mother liquor from said slurry in said purification zone upstream, with respect to crystal movement, of said melting zone; melting crystals in said melting zone; withdrawing the resulting melt from said melting zone as a purified product during the period when said slurry is moving through said purification zone, said melt being withdrawn at such a rate that substantially none of the melt is displaced from said melting zone into said moving slurry; terminating the movement of slurry through said purification zone; returning a portion of the withdrawn melt as reflux to said melting zone under pressure, thereby forcing melt from said melting zone upstream, with respect to crystal movement, through said purification zone; and removing a stream comprising mother liquor and occluded impurities from said purification zone upstream, with respect to crystal movement, of said melting zone.

2. The process of claim 1 in which the volume of withdrawn melt returned to said purification zone as reflux is about equal to the volume of mother liquor remaining in said slurry after separation of a measured amount of mother liquor from said slurry.

3. A process for separating a component from a liquid multicomponent mixture which comprises passing a slurry of crystals of said component in mother liquor into a purification zone; moving said slurry through said purification zone toward a melting zone maintained in one end of said purification zone at a temperature above the melting point of said crystals; separating a measured amount of mother liquor from said slurry in said purification zone upstream, with respect to crystal movement, of said melting zone; melting crystals in said melting zone; withdrawing the resulting melt from said melting zone as a purified product during the period when said slurry is moving through said purification zone, said melt being withdrawn at a rate such that substantially none of the melt is displaced from said melting zone into said moving slurry; terminating the movement of slurry through said purification zone; returning a portion of the withdrawn melt as reflux to said melting zone under pressure so as to force melt from said melting zone into said slurry, said melt thereby displacing mother liquor from said slurry and refreezing upon said crystals so as to aid in displacing occluded impurities therefrom; and removing a stream comprising mother liquor and displaced occluded impurities from said purification zone upstream, with respect to crystal movement, of said melting zone.

4. The process of claim 3 in which said multi-component mixture comprises alkylbenzenes.

5. The process of claim 4 in which said mixture contains para-xylene and said para-xylene is recovered as the product.

6. The process of claim 3 in which said multi-component mixture comprises benzene and a paraffinic hydrocarbon, and benzene is recovered as the product.

7. The process of claim 3 in which said multi-component mixture comprises cyclohexane and a paraffinic hydrocarbon, and cyclohexane is recovered as the product.

8. A process for separating a component from a liquid multi-component mixture which comprises cooling said mixture so as to form a slurry of crystals of said component in mother liquor; separating mother liquor from said slurry; passing the resulting thickened slurry of crystals in mother liquor into an elongated purification zone; moving said slurry through said purification zone toward a melting zone maintained in one end thereof; separating a measured additional amount of mother liquor from said slurry in said purification zone upstream, with respect to crystal movement, of said melting zone; supplying heat to said melting zone at a rate sufficient to maintain the temperature therein above the melting point of said crystals; melting crystals in said melting zone; withdrawing the resulting melt from said melting zone as a purified product during the period when said slurry is moving through said purification zone, said melt being withdrawn at a rate such that substantially none of the melt is displaced from said melting zone into said moving slurry; terminating the movement of slurry through said purification zone; returning a portion of the withdrawn melt as reflux to said melting zone under pressure so as to force melt from said melting zone into said slurry, said melt thereby displacing mother liquor from said slurry and refreezing upon said crystals so as to aid in displacing occluded impurities therefrom; and removing a stream comprising mother liquor and displaced occluded impurities from said purification zone upstream, with respect to crystal movement, of said melting zone.

9. The process of claim 8 in which the volume of withdrawn melt returned to said purification zone as reflux is about equal to the volume of mother liquor remaining in said slurry after separation of a measured amount of mother liquor therefrom in said purification zone.

10. Apparatus for the separation and purification of crystals which comprises, in combination, a crystal purification column; means for introducing crystals into one end of said column; means for heating the opposite end of said column; liquid withdrawal means connected to said opposite end; first reciprocating piston means for advancing crystals through said column toward said heating means; filtering means in an intermediate portion of said purification column; liquid outlet means connected to said filtering means; first flow control means in said liquid outlet means; a by-pass line connected to said liquid outlet means on either side of said first flow control means; second flow control means in said by-pass line; a rate of flow control means, said means being operatively connected to said liquid outlet means and to said second flow control means; a surge tank connected to said liquid withdrawal means; product outlet means connected to said surge tank; a reflux liquid cylinder; second reciprocating piston means disposed in said cylinder; first conduit means connecting said cylinder to said liquid withdrawal means; first valve means in said first conduit means for preventing flow of liquid from said liquid withdrawal means through said first conduit means; third flow control means positioned in said liquid withdrawal means between said surge tank and the juncture of said first conduit means and said liquid withdrawal means; second conduit means connected to said surge tank and to said first conduit means upstream from said first valve means; second valve means in said second conduit means for preventing flow of liquid through said conduit means into said surge tank; and fourth flow control means positioned in said second conduit means downstream from said second valve means.

11. The apparatus of claim 10 in which means are provided for synchronizing the operation of said first, third and fourth flow control means with the operation of said first and second reciprocating piston means so that said first flow control means is closed and said third and fourth flow control means are open during the compression stroke of said first piston means and during the backstroke of said second piston means, and so that said first flow control means is open and said third and fourth control means are closed while said first piston means is maintained at the end of its compression stroke and during the compression stroke of said second piston means.

References Cited in the file of this patent

UNITED STATES PATENTS

| | | |
|---|---|---|
| 2,617,274 | Schmidt | Nov. 11, 1952 |
| 2,683,178 | Findlay | July 6, 1954 |
| 2,747,001 | Weedman | May 22, 1956 |
| 2,765,921 | Green | Oct. 9, 1956 |
| 2,780,663 | Gunness | Feb. 5, 1957 |